United States Patent [19]

Axelson

[11] Patent Number: 4,524,984
[45] Date of Patent: Jun. 25, 1985

[54] CONTROLLABLE SLED FOR SNOW SKIING

[76] Inventor: Peter W. Axelson, 5858 Empire Grade, Santa Cruz, Calif. 95060

[21] Appl. No.: 179,562

[22] Filed: Aug. 19, 1980

[51] Int. Cl.³ .............................................. B67B 13/02
[52] U.S. Cl. ...................................... 280/18; 280/608
[58] Field of Search ............... 280/18, 19, 12 R, 12 B, 280/12 C, 12 H, 608, 609; 441/74, 79, 65, 68

[56] References Cited

U.S. PATENT DOCUMENTS

| | | | |
|---|---|---|---|
| 2,219,905 | 10/1940 | Prickman | 280/12 B |
| 2,829,902 | 4/1958 | Stocker | 280/18 |
| 2,862,719 | 12/1958 | Morz | 280/18 X |
| 2,927,799 | 3/1960 | Schnitzler | 280/18 |
| 3,169,779 | 2/1965 | Haab | 280/18 |
| 3,199,887 | 8/1965 | McKelvey | 280/18 |
| 3,237,222 | 3/1966 | Frost | 441/65 |
| 3,453,000 | 7/1965 | Asher | 280/18 |
| 3,512,195 | 5/1970 | Porsche | 280/18 X |
| 3,884,490 | 5/1975 | Hellman | 280/18 |

FOREIGN PATENT DOCUMENTS

| | | | |
|---|---|---|---|
| 1580181 | 7/1970 | Fed. Rep. of Germany | 280/18 |
| 1964299 | 6/1971 | Fed. Rep. of Germany | 280/18 |
| 2017827 | 10/1971 | Fed. Rep. of Germany | 280/18 |
| 226948 | 8/1943 | Switzerland | 280/608 |
| 1034394 | 6/1966 | United Kingdom | 280/18 |

Primary Examiner—Joseph F. Peters, Jr.
Attorney, Agent, or Firm—Victor R. Beckman

[57] ABSTRACT

A directionally controllable sled for downhill snow skiing has a unitary plastic body which includes a bottom member formed with a pair of downwardly and longitudinally extending elongated runners along opposite sides thereof. The pair of runners are spaced generally flat bottom surfaces and have inwardly facing plane control surfaces extending generally perpendicular to the bottom surfaces and intersecting along facing edges which are effective for directional control of the sled by the user during sled movement. The runners are formed with smoothly curved outwardly facing sides which are substantially less effective than the inwardly facing runner edges for directionally controlling the sled.

10 Claims, 9 Drawing Figures

U.S. Patent  Jun. 25, 1985  Sheet 1 of 2  4,524,984
FIG-1
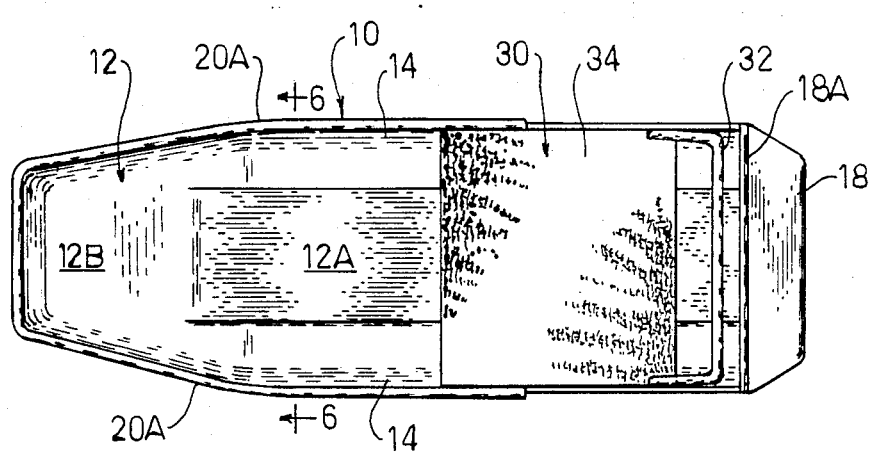
FIG-2
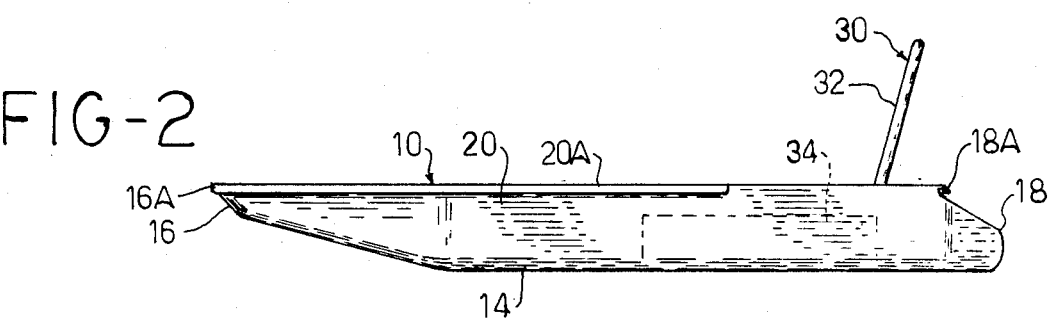
FIG-3
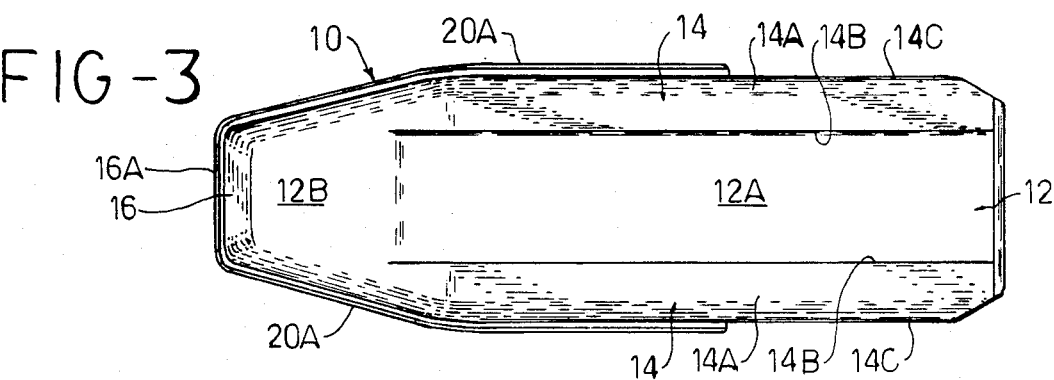
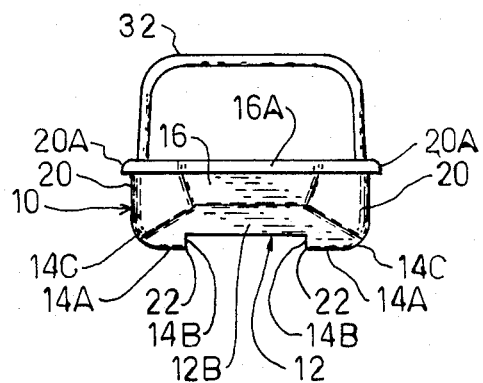
FIG-4
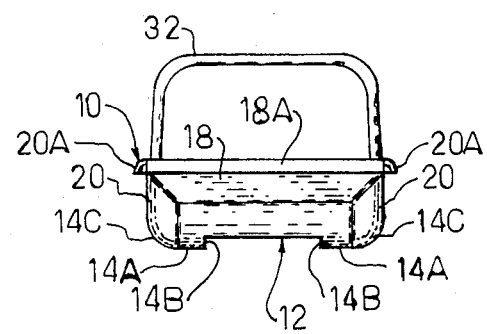
FIG-5

CONTROLLABLE SLED FOR SNOW SKIING

BACKGROUND OF THE INVENTION

As is well understood, a skiing device will travel downhill along the fall line unless otherwise diverted therefrom; the fall line being the natural path along which an object is pulled by gravity down a slope. Many skiing devices, including ski sleds, are not allowed on many ski slopes because effective control thereof in either direction and/or speed is not possible. With many devices turning, traversing and/or stopping control often is lacking, particularly on ski runs of significant slope, including so called intermediate and advanced runs. Turning herein refers to a change in direction from the fall line and traversing refers to the ability to travel a straight line across the face of the ski run without slipping downhill along the fall line.

Sleds, of course, are well known including, for example, the traditional sled which has narrow steel runners. However, icy or hard packed snow conditions are required for its use to prevent sinking thereof deeply into the snow. Also, such sleds chop up the snow on the slope and are difficult to stop or turn quickly enough to avoid other skiers. A Norwegian developed sled, or "polk" also is known, comprising a one-piece glass strand reinforced plastic body which sled is capable of operation under softer snow conditions. However, the running surface of this sled is such that directional control thereof is extremely difficult making operation on a ski slope hazardous. Further, prior art sleds are not designed for ski lift use with the user seated therein.

SUMMARY OF THE INVENTION AND OBJECTS

An object of this invention is the provision of a controllable ski sled which avoids the above-mentioned and other shortcomings and disadvantages of prior art sleds.

An object of this invention is the provision of a ski sled which is readily controllable in both direction and speed by the user during travel and which many be operated on ski runs including those of significant slope.

An object of this invention is the provision of a controllable ski sled which is positionable in the chair of a standard ski lift for transportation of the sled with the user seated therein up a ski slope.

The above and other objects and advantages of this invention are achieved by use of a sled comprising a unitary plastic body having an elongated bottom member formed with a pair of downwardly extending runners along opposite sides thereof. The bottom member tapers inwardly at both the front and rear ends thereof. The forward end section of the bottom member slopes upwardly toward the front of the sled, with portions of said sloping bottom section comprising runner fronts located rearwardly of the front of the sled. The runners which extend to the rear of the sled, have a length equal to approximately 70 percent of the total length of the sled. Upwardly extending front, rear, and opposite side walls are formed on the bottom member, the upper ends of which terminate substantially in a plane parallel to the runners and main bottom section. The pair of runners include spaced generally plane bottom surfaces and spaced inwardly facing generally plane parallel control surfaces which extend generally perpendicular to said runner bottom surfaces. A runner edge is formed at the intersection of the runner bottom and control surface of each runner, which edges are effective for directional control of the sled by the occupant during use. The outer runner walls curve upwardly, with adjacent portions of the sled side walls comprising continuations thereof. With this construction, no edge is formed along the outer runner faces and, as a result, the outwardly facing runner surfaces are substantially less effective than said inwardly facing runner control surfaces for directional control of the sled by the user. If desired, elongated runner blades may be attached to said inwardly facing control surfaces of the runners, which blades extend downwardly below the bottoms of the runners for cutting into the snow to further facilitate control of the sled during a run. An outwardly directed flange is formed at the upper edge of the front wall and adjacent portions of the side walls, which flange reinforces the body and functions as a hand grip for lifting the sled and occupant seated therein. The flange also provides an interface for use in attaching a snow skirt to the sled to prevent snow from entering the same. The rear wall is inclined downwardly and rearwardly from the upper edge thereof to further reduce the rear end of the sled to a size which fits beneath the back rest of a standard ski lift chair. The sled is provided with a seat having a back rest adjacent the rear of the sled.

BRIEF DESCRIPTION OF THE DRAWINGS

The invention, together with other objects and advantages thereof, will be better understood from the following description considered with the accompanying drawings. In the drawings, wherein like reference characters refer to the same parts in the several views:

FIG. 1 is a top plan view of a controllable ski sled embodying the present invention;

FIG. 2 is a side elevational view of the sled shown in FIG. 1;

FIG. 3 is a bottom view of the sled shown in FIG. 1;

FIG. 4 is a front elevational view of the sled shown in FIG. 1;

FIG. 5 is a rear elevational view of the sled shown in FIG. 1;

Figure 6:
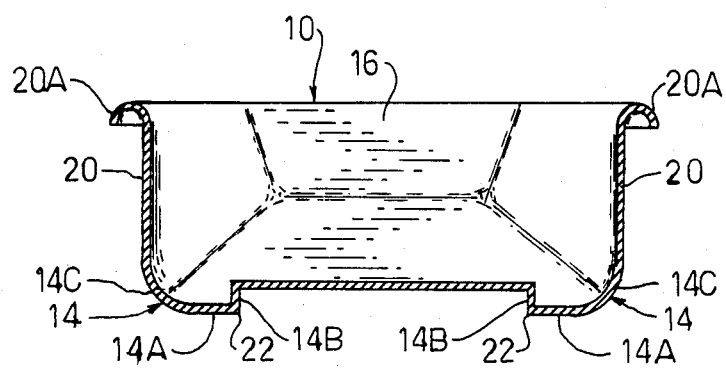
FIG. 6 is an enlarged cross-sectional view of the sled taken substantially along line 6—6 of FIG. 1.

One form of the present invention is shown in FIGS. 1-6, to which figures reference first will be made. The novel controllable snow ski sled is shown comprising a unitary hull-like body 10 comprising a bottom member 12 formed with a pair of downwardly extending runners 14, 14 along opposite sides thereof. The bottom member includes an elongated plane rear section 12A, extending parallel with the bottom surfaces 14A, 14A of the runners, and a plane forward section 12B which slopes upwardly from section 12A to a downwardly, inwardly, sloping front wall 16 integrally formed with the bottom member. In addition to front wall 16, the sled includes a rear wall 18 and opposing generally vertical side walls 20,20, the upper edges of which walls terminate substantially in a plane extending parallel to the rear bottom section 12A of the bottom member.

In accordance with one feature of the present invention the runners 14, 14 are formed with inwardly facing generally plane runner control surfaces 14B, 14B extending substantially perpendicular to both the runner bottom surfaces 14A, 14A and to the respective rear and front sections 12A and 12B of the bottom member. An edge, identified by reference numeral 22 is formed along the intersection of the bottom surface 14A and control surface 14B of each runner which is effective during operation of the sled for use in direction control thereof. The outer sides of the runners 14,14 curve upwardly to form smooth curved surfaces 14C, 14C from the upper ends of which the sidewalls 20,20 extend. In comparison to the inner vertical control surfaces 14B, 14B, the outer curved surfaces 14C, 14C are substantially ineffective for use in directional control of the sled. For the inner runner surfaces 14B, 14B to be effective, runners of a height of at least ¾ inches and preferably having a height of at least 1 inch are required. However, the runners should be of no greater height than is required for effective directional control of the sled. Under icy conditions only the sled runners and chimes 14A contact the snow. However, in soft snow, wherein the sled sinks into the snow surface, a portion of the weight is carried by the bottom 12 between the runners. Under such conditions, runners of substantial height would allow for more rapid turning and stopping ability; although it would be more difficult to initiate such turns and stops on the part of the skier. Consequently, the use of such substantial edges would allow the strong skier to ski so-called advanced ski runs while making it more difficult for a weaker skier to ski so-called intermediate or beginner ski runs. A runner height of between, say, ¾ to 1¼ inches has been found to be satisfactory, with a 1 inch height being preferred.

In accordance with another feature of the present invention, the runners 14, 14 do not extend for the entire length of the sled but, instead, they extend from a spaced distance from the front end 16 of the sled to the rear end 18. With the illustrated arrangement the runners extend along approximately 70 percent of the length of the sled adjacent the rear of the sled. The fronts of the runners simply comprise portions of sloping bottom section 12B. By terminating the runners rearwardly of the front end, directional control of the sled by the occupant is greatly facilitated. Operation of the sled is described in greater detail hereinbelow following completion of the description of the sled construction.

As noted, the upper edges of the front, rear, and opposite side walls of the sled terminate, substantially, in a plane extending generally parallel to the bottom of the runners. For snow skiing, a sled with an overall height on the order of six inches has been found to be satisfactory. Of course, this height is not critical and may differ therefrom. However, a relatively low height, at least at the rear of the sled, is desired where the sled with occupant is to be transported by means of a chairlift.

For additional sled body strength, the upper edges of the front and rear walls, and the forward portions of the front walls are formed with outwardly directed curved flanges identified by reference characters 16A, 18A and 20A, 20A. It will be seen that the front 16A and side 20A, 20A flanged edges comprise segments of a unitary flanged edge further adding to the structural rigidity of the sled. It also will be noted that the side flanges 20A, 20A terminate a spaced distance from the rear of the sled to provide for a minimum sled width adjacent the rear thereof. A width on the order of approximately 18 inches is desirable which is sufficient to accommodate a single occupant in a sitting position and yet is sufficiently narrow to fit within the seat of a center pole type chairlift. To further facilitate use on a chairlift, the rear of the sled, on the order of approximately 6 inches thereof, tapers inwardly along the side walls 20,20 and downwardly along the rear wall 18 enabling said tapered rear section to extend through the open back rest portion of the standard chair lift. Consequently, the sled with an occupant therein may be positioned on the chairlift with the occupant seated directly over the seat of the chair for balanced support thereon. The wall flanges provide gripping areas to facilitate lifting of the sled and occupant onto the chair and carrying of the sled. Also, the flanges facilitate fastening of a protective skirt, or cover, over the forward portion of the sled body opening to protect the occupant's lap and legs from snow and cold.

As seen in the drawings, the front of the sled also tapers inwardly along the sidewalls thereof. With the illustrated sled, the side wall taper begins at approximately the same location at which the bottom 12 begins sloping upwardly. For purposes of illustration only, and not by way of limitation, the sled may have an overall length of 52 inches and be formed with a taper along the forward 29 percent thereof. With the illustrated taper, the width of the sled narrows at the front thereof to approximately 60% of the maximum width. The front taper provides the sled with a pleasant, streamlined, appearance and a reduced bottom surface along the sloping front bottom section 12B.

The sled is provided with a seat 30 which includes a back rest 32 and seat portion 34 which are attached to the sled body 10 by any suitable means, not shown. Preferably, the seat 30 is longitudinally movably positioned within the sled body to provide for positional adjustment in accordance with the size and weight of the user. From FIG. 2 it will be seen that the seat portion 34 is located to the rear of the longitudinal center of the runners. As described below, by leaning forward, the occupant's center of gravity may be moved to a position forward of the longitudinal center of the runners to facilitate turning control.

Figure 7:
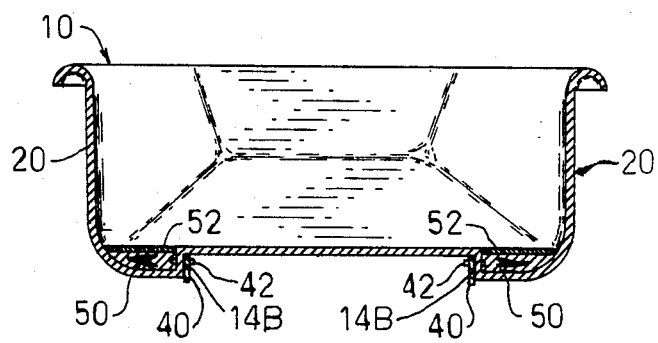
FIG. 7 is a cross-sectional view which is similar to that of FIG. 6 but showing a modified form of this invention which includes runner blades attached to the control surfaces of the runners, and runner filling material.
Figure 8:
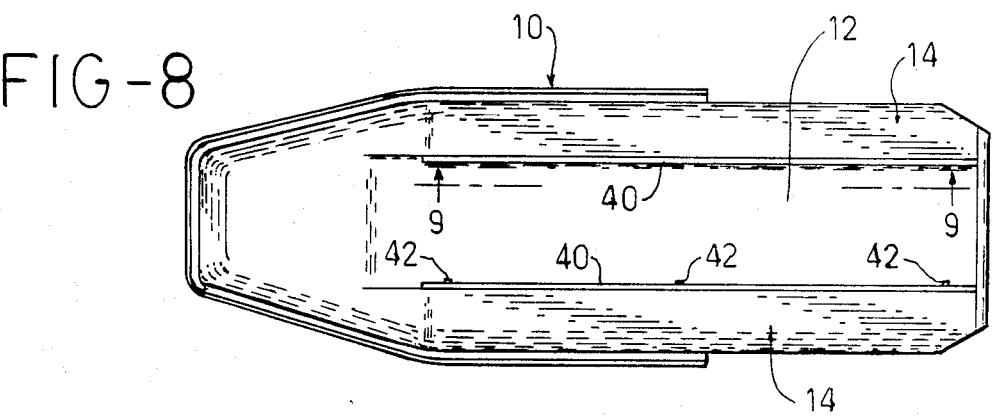
FIG. 8 is a bottom view which is similar to that of FIG. 3 but showing attached runner blades.
Figure 9:
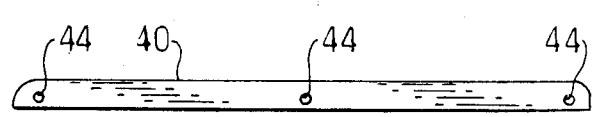
FIG. 9 is a side elevational view of one of the runner blades as viewed along line 9—9 of FIG. 8.

Reference now is made to FIGS. 7-9 of the drawings wherein a modified form of this invention is shown which includes runner blades 40,40 attached to the control surfaces 14B, 14B of the runners 14, 14. Except for the inclusion of the runner blades 40, 40, the sled body 10 may be of the same type shown in FIGS. 1-6 and described above. The illustrated runner blades 40,40 extend substantially the entire length of the runners 14, 14 and protrude downwardly from the bottom surfaces 14A, 14A of the runners. They may be attached to the control surfaces by suitable fastening means such as rivets 42 seen in FIG. 7. Holes 44 (FIG. 9) are formed along the runner blades to accommodate the fastening means. The runner blades 40,40 protrude downwardly from the runner bottoms only a short distance on the order of, say 1/16 to ¼ inch, and provide the sled with added control particularly on hard, icy, slopes. Protrusion of the runner blades also allows for sharpening of the blade edge using a standard edge file of the type designed for conventional down hill skis. The runner blades are made of any suitable material, such as stainless steel, Runner control surfaces now comprise the inwardly facing surfaces of the runner blades. The portions of the outer faces of the runner blades which extend downwardly below the bottom surfaces of the runners 14, 14 are substantially less effective than the much larger free inner control faces of the runner blades for sled control. It will be apparent, then, that the main sled control surfaces comprise the inner facing surfaces of the runner blades. As seen in FIG. 8, and noted above, the runner blades 40,40 extend substantially the entire length of the sled runners. Obviously, they may be shorter than the runners, if desired, terminating a spaced distance from the front of the runners.

For added strength, solid material may be fastened inside the runners 14, 14. As best seen in FIG. 7, wooden members 50,50 are located inside the runners, and are attached thereto as by cementing, or the like. If desired, plastic layers 52, 52 may be coated over the wood to protect the same. Preferably, cross-cut balsa wood of, say, ¼ inch thickness is layered and bonded within the runners, the fibers of which wood also bond well with the plastic material of which the sled body is constructed, to create a sandwich effect making the sled much stronger than it would be using an equivalent amount of glass-reinforced plastic without the balsa wood. Also, a metal piece, not shown, such as aluminum, or stainless steel, can be located inside the runners to provide a firm anchor point for the fasteners used to fasten the runner blades to the sled runners.

Although not limited in use, the controllable sled of this invention is particularly well adapted for use by disabled persons unable to participate in the conventional sport of downhill skiing. For example, the controllable sled is well adapted for use by paraplegics, and others with disabilities of the legs, back, or the like. Preferably, a seat belt and a knee strap, not shown, are included in the sled construction for strapping the user into the sled to provide a skier-sled interface comparable to the foot-ski boot interface present in downhill skiing. Also, as noted above, a cover, not shown, is provided for covering the user's body from the waist down. The flanged edges provide a convenient mechanism for anchoring the cover. The cover may be provided with a drawstring or elastic waist band for tightly pulling the same around the user's waist.

The user is provided with short ski poles or a long double-ended ski pole, or any of a number of other hand-held devices to aid the skier in both propelling the sled over relatively flat surfaces, and initiating turns. When used by an able-bodied person the sled may be transported up the slope on the lap of the person seated on a ski lift. For chair lift use by a disabled person with little or no experience, the chairlift is stopped and the sled is manuevered into position in front of the chair. The sled, with the user therein, then is simply lifted onto the chair by persons at opposite sides thereof. The tapered rear end of the sled extends through the backrest of the chair to approximately the rear-flange 18A to enable positioning of the sled seat 30 directly above the chair lift seat. Without side flanges 20A,20A at the rear of the sled, the sled is sufficiently narrow to fit between opposite upright side members included in the construction of conventional center pole chair lifts. A suitable safety strap, not shown, attached to the sled and having a releasable coupling is included for releasably coupling the sled to the chair for added safety during the ascent. To disembark from the chair at the upper end of the run, the lift again is stopped and, with the safety strap released, the user simply tilts forward until the front of the sled rests on the snow and then pushes off from the chair while an able-bodied person holds the chair to prevent its swinging into the back of the user. The ski pole, or poles, which may be placed on the user's lap during the chair lift ride, are used to propel the sled off the ramp and to the ski run. An experienced disabled person can load the chairlift without stopping the chairlift, provided an experienced companion and experienced chairlift personnel are available for assistance. Also, with minimum experience, the user can dismount the chairlift without the chairlift being stopped. Obviously, devices other than a ski pole, or poles, may be used. For example, short outriggers of the type used by amputee skiers may be employed.

For manueverability during a run sufficient speed is required and generally is readily attained on intermediate ski runs. To change direction, the user simply pushes one end of, say, the double ended pole into the snow keeping the elbow on the opposite arm high. This causes an angulation of the body which translates the pushing motion into a pushing of the hips and sled in the opposite direction. Pushing on the left thus causes the tail of the sled to translate to the right for the initiation of a left-hand turn. To complete the turn the skier must continue the initial push forward toward the outside, simply meaning that the user is now leaning forward to shift the center of gravity forward. This completes the turn and prevents the sled from turning around backwards when done properly.

To hold a traverse the user simply maintains this position while crossing the hill. It will be seen that with the illustrated sled construction the user's center of gravity is shiftable over substantially the entire length of the runners, depending upon the user's forward or rearwardly leaning position while seated in the sled.

More advanced and stronger skiers are able to turn by different techniques. One of these is leaning forward, shifting the center of gravity forward, and thrusting the hips by means of abdominal and back muscles to one direction or the other. This hip thrust results in the tail of the sled translating in the same direction as the hip thrust since the user is strapped into the sled. The sled turns in the opposite direction to that of hip translation. The resulting turn is completed by leaning forward throughout the turn. This is done in order to prevent the sled from turning around, as previously described.

The sled will turn back into the fall line when the user sits back in the seat. To stop, the skier continues a turn so that with the sled turned substantially to the direction of travel, the uphill runner control surface engages the snow to rapidly stop the sled. During such turns and stops the effectiveness of the downhill runner is substantially reduced; thereby avoiding tipping or over-turning of the sled.

The invention having been described in detail in accordance with requirements of the U.S. Patent Statutes, various other changes and modifications will suggest themselves to those skilled in this art. For example, the sled may be provided with a flange at the upper edge of the body which extends completely around the sled, which would add further to the strength thereof. Also, it will be understood that the plastic body may be formed using any suitable prior art construction methods. For example, any type of fiberglass layup process may be used to construct the sled. Also, the construction is well suited for use of a vacuforming process, in which case somewhat more flexible material than reinforced plastic resins may be used to provide for a durable yet more flexible sled. It is intended that the above and other such changes and modifications shall fall within the spirit and scope of the invention as defined in the appended claims.

I claim:

1. In a controllable ski sled for use on ski slopes, or the like, comprising a unitary body which includes a bottom member formed with a pair of parallel downwardly extending runners along opposite sides thereof, said body including front, rear and opposite side walls extending upwardly from said bottom member and which terminate at the upper edge substantially in a plane extending generally parallel to said runners, said side walls tapering inwardly at the rear thereof and said rear wall slanting downwardly from the top to provide a reduced size sled rear end insertable through the back rest of a chair lift seat for stable support of the sled and sled occupant on the chair lift seat.

2. In a controllable ski sled for use on ski slopes, or the like, comprising a unitary body which includes a bottom member formed with a pair of parallel downwardly extending runners along opposite sides thereof, said pair of runners comprising,
    spaced generally plane bottom surfaces,
    inwardly facing generally plane runner control surfaces in planes extending at least substantially 90 degrees with respect to said associated bottom surfaces, said inwardly facing generally plane runner control surfaces including portions extending below the bottom surfaces of said runners, which control surfaces are effective for use in directional control of the sled during sled movement down a ski slope, and
    outer curved runner surfaces which are substantially less effective than said inwardly facing control surfaces for directional control of the sled, said runner surfaces allowing for sideways sliding motion of the sled without tipping while at the same time resisting sideways sliding motion to provide user control of sled speed and direction of travel in use.

3. In a controllable ski sled as defined in claim 2 wherein the runner control surface height is between approximately ¾ and 1¼ inches.

4. In a controllable ski sled for use on ski slopes, or the like, comprising a unitary body which includes a bottom member formed with a pair of parallel downwardly extending runners along opposite sides thereof, said bottom member including a rear bottom section extending between said runners, said pair of runners comprising,
    spaced generally plane bottom surfaces,
    inwardly facing generally plane runner control surfaces in planes at least substantially 90 degrees with respect to said associated bottom surfaces, which control surfaces are effective for use in directional control of the sled during sled movement down a ski slope, said inwardly facing generally plane runner control surfaces including portions extending below the bottom surfaces of said runners, and
    outer curved runner surfaces which are substantially less effective than said inwardly facing control surfaces for directional control of the sled, said runner control surfaces allowing for sideways sliding motion of the sled without tipping while at the same time resisting sideways sliding motion to provide user control of sled speed and direction of travel in use.

5. In a controllable ski sled as defined in claim 4 wherein the front of said pair of runners is located substantially at the junction between said rear section of the bottom member and an upwardly inclined forward section of the bottom member.

6. In a controllable ski sled as defined in claim 5 wherein said runners and rear section of the bottom member extend for approximately 70 percent of the overall sled length.

7. In a controllable ski sled for use on ski slopes, or the like, comprising a unitary body which includes a bottom member formed with a pair of parallel downwardly extending runners along opposite sides thereof, said pair of runners comprising,
    spaced generally plane bottom surfaces,
    inwardly facing generally plane runner control surfaces extending generally perpendicular to said bottom surfaces, which control surfaces are effective for use in directional control of the sled during sled movement down a ski slope, and
    outer curved runner surfaces which are substantially less effective than said inwardly facing control surfaces for directional control of the sled, said sled including
    a pair of elongated runner blades attached to said runner control surfaces and having portions extending downwardly below the bottom surfaces of the runners for increased directional control of the sled.

8. In a controllable ski sled as defined in claim 7 wherein said runner blades extend substantially the entire length of said runners.

9. In a controllable ski sled as defined in claim 8 wherein said runner blades and runners extend for approximately 70 percent of the overall length of said sled and extend forwardly from the rear of the sled.

10. In a controllable ski sled as defined in claim 7 wherein said downwardly extending runner blades are constructed and arranged to allow for sharpening bottom edges using a standard ski edge file.

* * * * *